United States Patent
Heber et al.

(10) Patent No.: US 9,972,316 B2
(45) Date of Patent: May 15, 2018

(54) ISOLATION AND ENHANCEMENT OF SHORT DURATION SPEECH PROMPTS IN AN AUTOMOTIVE SYSTEM

(71) Applicant: Harman International Industries, Incorporated, Stamford, CT (US)

(72) Inventors: Kevin Eric Heber, Carmel, IN (US); Samarth Hosakere Shivaswamy, Novi, MI (US)

(73) Assignee: Harman International Industries, Incorporated, Stamford, CT (US)

(*) Notice: Subject to any disclaimer, the term of this patent is extended or adjusted under 35 U.S.C. 154(b) by 0 days. days.

(21) Appl. No.: 15/395,367

(22) Filed: Dec. 30, 2016

(65) Prior Publication Data

US 2017/0193991 A1    Jul. 6, 2017

Related U.S. Application Data

(60) Provisional application No. 62/273,279, filed on Dec. 30, 2015.

(51) Int. Cl.
| | |
|---|---|
| *H04R 5/00* | (2006.01) |
| *G10L 15/20* | (2006.01) |
| *G10L 15/22* | (2006.01) |
| *G06F 3/16* | (2006.01) |
| *H04R 3/12* | (2006.01) |
| *H04R 3/04* | (2006.01) |
| *H04S 7/00* | (2006.01) |

(52) U.S. Cl.
CPC .............. *G10L 15/20* (2013.01); *G06F 3/165* (2013.01); *G10L 15/22* (2013.01); *H04R 3/12* (2013.01); *G10L 2015/221* (2013.01); *G10L 2015/223* (2013.01); *H04R 3/04* (2013.01); *H04R 2430/01* (2013.01); *H04R 2499/13* (2013.01); *H04S 7/30* (2013.01)

(58) Field of Classification Search
CPC ........ H04R 2499/13; H04R 3/12; H04R 3/04; H04R 2430/01; H04S 7/30; G10L 2015/221; G10L 15/22; G10L 15/20; G10L 2015/223; G06F 3/165
USPC ....................................................... 381/17, 86
See application file for complete search history.

(56) References Cited

U.S. PATENT DOCUMENTS

2016/0210110 A1* 7/2016 Feldman .................. G06F 3/165

* cited by examiner

*Primary Examiner* — Paul S Kim
(74) *Attorney, Agent, or Firm* — Brooks Kushman P.C.

(57) ABSTRACT

In at least one embodiment, an apparatus for enhancing speech prompts in a vehicle is provided. The apparatus includes an audio processor that is electrically coupled to a plurality of loudspeakers in a vehicle. The audio processor being programmed to provide entertainment data to the plurality of loudspeakers for playback in the vehicle and to receive a speech prompt indicative of only a spoken audio output to a driver in the vehicle. The audio processor is further programmed to mute the entertainment data that is played back on a first loudspeaker of the plurality of loudspeakers in response to the speech prompt and to provide the speech prompt to the first loudspeaker for playback to the driver in response to the speech prompt.

16 Claims, 3 Drawing Sheets

ISOLATION AND ENHANCEMENT OF SHORT DURATION SPEECH PROMPTS IN AN AUTOMOTIVE SYSTEM

CROSS-REFERENCE TO RELATED APPLICATIONS

This application claims the benefit of U.S. provisional application Ser. No. 62/273,279 filed on Dec. 30, 2015, the disclosure(s) of which is hereby incorporated in its entirety by reference herein.

TECHNICAL FIELD

Aspects disclosed herein generally relate to an apparatus, system or method that performs isolation and enhancement of short duration speech prompts in an automotive setting.

BACKGROUND

Short duration prompts (e.g., speech prompts) are generally short pieces of audio speech or audio-like instructions in a particular language such as English or another language that provides navigational, general, or warning messages from a vehicle information or entertainment system to a driver of a vehicle. In this case, a vehicle audio system may electrically playback the speech prompts. Since the primary role of the vehicle audio system is to playback entertainment media (or entertainment audio) from sources such as BLUETOOTH, radio or Universal Serial Bus (USB), the electrically generated speech prompts may be in direct electrical and acoustical conflict with audio from the various entertainment sources. The speech prompts are directed to the driver and are generally of no use to other passengers in the vehicle. Whereas the entertainment audio, for example, music, news, etc. is directed towards all occupants of the car. Thus, a compromise is necessary to ensure that the music (or other entertainment audio) that is being played for non-drivers through the speakers is not interrupted with the speech prompts in the vehicle while at the same time the speech prompts are properly audible to the driver.

The conflict between the audio from speech prompts and music sources may be resolved in different ways in different vehicle audio systems. One approach may involve reducing the level of the music (or entertainment audio) from all speakers while keeping the level of the speech prompts unaltered. This maintains the intelligibility of speech in the prompts. Another approach may require that the speech prompts are played back from selected speakers so that the remaining speakers play back music without any interruptions. In both cases, the passengers experience an interruption in the music listening experience.

SUMMARY

In at least one embodiment, an apparatus for enhancing speech prompts in a vehicle is provided. The apparatus includes an audio processor that is electrically coupled to a plurality of loudspeakers in a vehicle. The audio processor being programmed to provide entertainment data to the plurality of loudspeakers for playback in the vehicle and to receive a speech prompt indicative of only a spoken audio output to a driver in the vehicle. The audio processor is further programmed to mute the entertainment data that is played back on a first loudspeaker of the plurality of loudspeakers in response to the speech prompt and to provide the speech prompt to the first loudspeaker for playback to the driver in response to the speech prompt.

In at least one embodiment, a method for enhancing speech prompts in a vehicle is provided. The method includes providing, via an audio processor, entertainment data to a plurality of loudspeakers for playback in a vehicle and receiving a speech prompt at the audio processor, the speech prompt being indicative of only a spoken audio output to a driver in the vehicle. The method further includes muting the entertainment data that is played back on a first headrest loudspeaker in response to the speech prompt and providing the speech prompt to the first headrest loudspeaker for playback to the driver in response to the speech prompt.

In at least one embodiment, a computer-program product embodied in a non-transitory computer readable medium that is programmed for enhancing speech prompts is provided. The computer-program product includes instructions to provide entertainment data to a plurality of loudspeakers for playback in a vehicle and to receive a speech prompt indicative of only a spoken audio output to a driver in the vehicle. The computer-program product further includes instructions to mute the entertainment data that is played back on a first headrest loudspeaker and a second headrest loudspeaker in response to the speech prompt and to provide the speech prompt to the first headrest loudspeaker for playback to the driver in response to the speech prompt.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
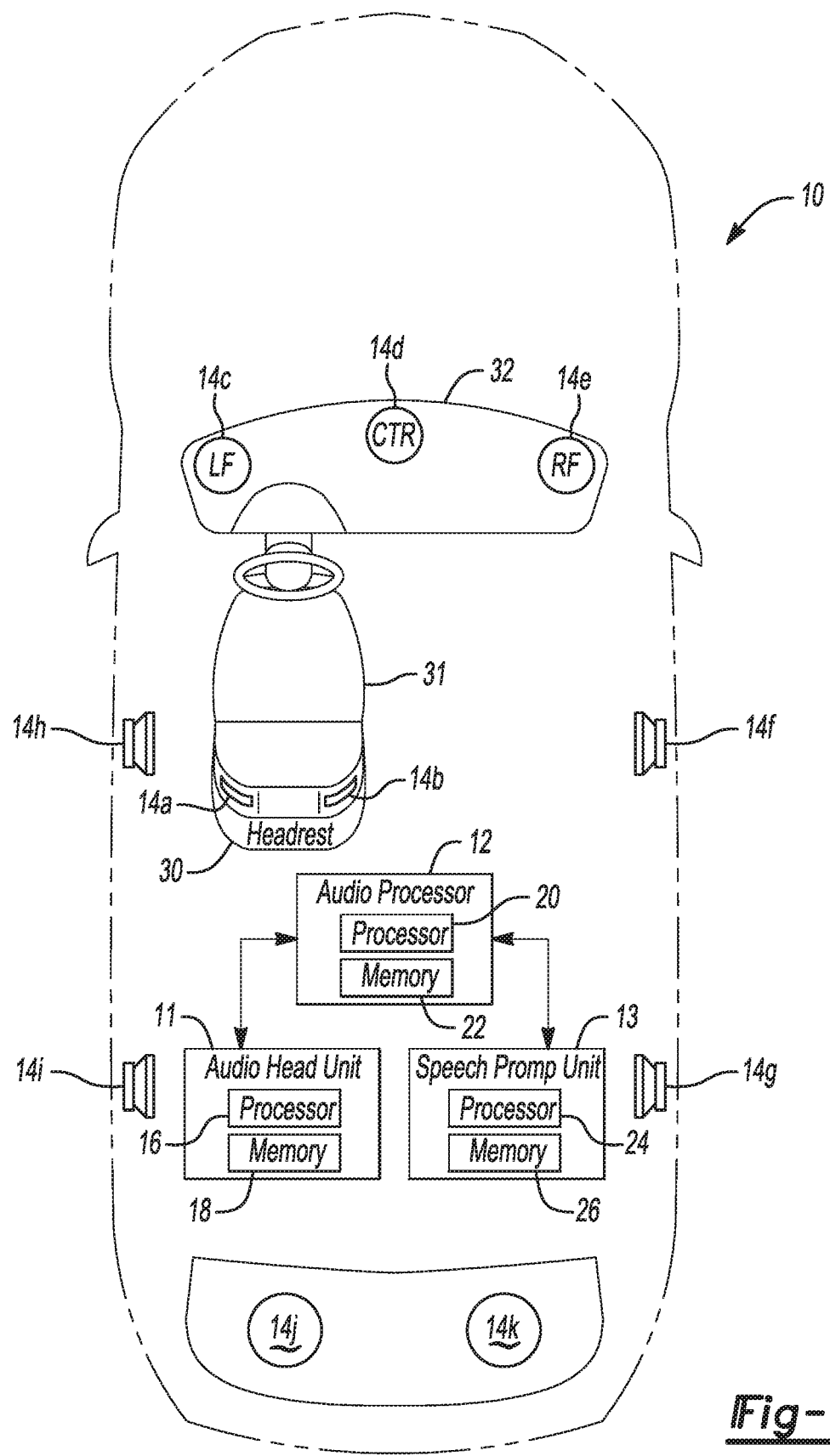
FIG. 1 depicts a vehicle system that isolates speech prompts in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits, at least one controller, processor, or other computer based devices. All references to these devices and the functionality provided by each, are not intended to be limited to encompassing only what is illustrated and described herein. While particular labels may be assigned to the foregoing devices, such labels are not intended to limit the scope of operation for the noted devices. It is recognized that the devices may be combined with each other and/or separated in any manner based on the particular type of electrical implementation that is desired.

It is recognized that the devices (e.g., controllers, processors, head units, speech prompt units, etc.) as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, the devices noted herein may utilize one or more microprocessors to execute a computer-program that is embodied in a non-transitory computer readable medium that is programmed to perform any number of the functions as disclosed. Further, the devices as noted herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for receiving and transmitting data, respectively from and to other hardware based devices as discussed herein.

It is generally desirable to enable the driver to hear a speech prompt from the vehicle while at the same time avoid distracting other passengers in the vehicle from listening to entertainment data (or entertainment audio) from a music source in the vehicle. The conflict between the audio from speech prompts and music sources may be resolved in different ways and in different vehicle audio systems. One approach may involve reducing the level of the music (or entertainment audio) from all speakers while keeping the level of the speech prompts unaltered. This approach maintains the intelligibility of speech in the prompts. Another approach may require that the speech prompts are played back from selected speakers so that the remaining speakers play back music without any interruptions. In both cases, the passengers experience an interruption in the music listening experience.

Aspects disclosed herein strive to make the music listening experience in a vehicle as personal as possible. The disclosed aspects enable different occupants in the vehicle to listen to different, unrelated source audio material with minimal interference. Thus, the disclosed aspects may minimize acoustically noticeable interactions between numerous sources. These attributes and others will be discussed in more detail below.

FIG. 1 depicts a vehicle audio system (or system) 10 in a vehicle that isolates speech prompts in accordance to one embodiment. The system 10 generally includes at least one audio head unit 11 (hereafter "the audio head unit 11"), at least one audio processor 12 (hereafter "the audio processor 12"), at least one speech prompt unit 13 (hereafter "the speech prompt unit 13"), and a plurality of speakers 14a-14k (or "14"). It is recognized that the audio head unit 11 includes any number of processors 16 and memory 18 for executing instructions to provide the various functions or features disclosed hereafter. It is further recognized that the audio processor 12 includes any number of processors 20 and memory 22 for executing instructions to provide the various functions or features disclosed hereafter. It is further recognized that the speech prompt unit 13 includes any number of processors 24 and memory 26 for executing instructions to provide the various functions or features disclosed hereafter.

The speech prompt unit 13 may be a navigation unit or any suitable electronic unit that is arranged to provide speech prompts to the driver. The speech prompts are generally indicative of only a spoken audio output to a driver in the vehicle. In one example, the speech prompt unit 13 may provide audible directions to the driver while performing navigation operations. In another example, the speech prompt unit 13 (or communication unit) may enable hands free operation of a mobile device (not shown) between the driver and the vehicle in which the driver is able to provide an audible input to a microphone (not shown) in the vehicle which is then received through a cellular network to communicate to a mobile device exterior to the vehicle. In this case, the speech prompt unit 13 may provide speech prompts as a return dialogue from a user who is engaged in mobile device discussion with the driver. It is recognized that the speech prompts may take on any number of forms and that those noted herein are not intended to be an exhaustive listing of the speech prompts provided from the vehicle.

In general, the audio head unit 11 is configured to provide entertainment data (e.g., music, news, etc.) to the audio processor 12. The audio processor 12 is configured to perform, but not limited to, equalization, compression, etc. on the received entertainment data. The audio processor 12 provides the entertainment audio to any one or more of the speakers 14a-14k in the vehicle. In turn, the speakers 14a-14k audibly playback the entertainment audio for various occupants in the vehicle for entertainment purposes. As noted above, the speech prompt unit 13 is configured to provide various speech prompts to the audio processor 12. The audio processor 12 processes the speech prompts (e.g., performs equalization, compression, etc.) and transmits the same to the speakers 14.

A headrest 30 of a driver seat 31 generally includes the speakers 14a and 14b. The audio head unit 11 is configured to provide, via the audio processor 12 and the speakers 14a, 14b, the entertainment audio to the driver. The speech prompt unit 13 is configured to provide, via the audio processor 12 and the speakers 14a, 14b, speech prompts to the driver. An instrument panel 32 includes the speakers 14c, 14d, and 14e. The speaker 14c may be designated as a left front speaker (or a mid-range speaker or tweeter). The speaker 14d may be designated as a center speaker and may be a mid-range speaker. The speaker 14e may be designated as a right front speaker (or a mid-range speaker or tweeter). Likewise, each speaker 14f, 14g, 14h, and 14i is positioned within a corresponding vehicle door or side pillar (not shown). The speakers 14j and 14k may be positioned in a rear of the vehicle. It is recognized that any one of the speakers 14f-14k may be arranged as a tweeter, woofer, or mid-range speaker.

In reference back to the speakers 14a and 14b positioned within the headrest 30, each of these speakers 14a and 14b are generally larger in size than earphone speakers but generally smaller in size than the remaining speakers 14c-14k. Due to the speakers 14a and 14b being positioned in the driver headrest 30, such speakers 14a and 14b are understandably closer to the driver's ear than the speakers 14c-14n. As such, the audio processor 12 is generally configured to provide the speech prompt (i.e., from the speech prompt unit 13) and the entertainment audio (i.e., from the audio head unit 11) to the speakers 14a and 14b for transmission to the driver. Due to the close proximity of the speakers 14a and 14*b* to the driver, the speakers 14*a* and 14*b* may utilize less power to play the content to the driver in comparison to the amount of power that is utilized by the speakers 14*c*-14*k*. It should be recognized that all of the speakers 14*a*-14*k* transmit or play the entertainment audio, but only the speakers 14*a* and 14*b* playback the speech prompts and the entertainment audio to the driver.

In general, the system 10 may minimize interference between the speech prompt(s) for its intended audience (i.e., the driver) and the entertainment audio for the other vehicle passengers in the vehicle. The system 10 may also maintain a minimum level differential between the speech prompts and the entertainment audio from the various entertainment or music sources. These aspects and others will be discussed below.

Figure 2:
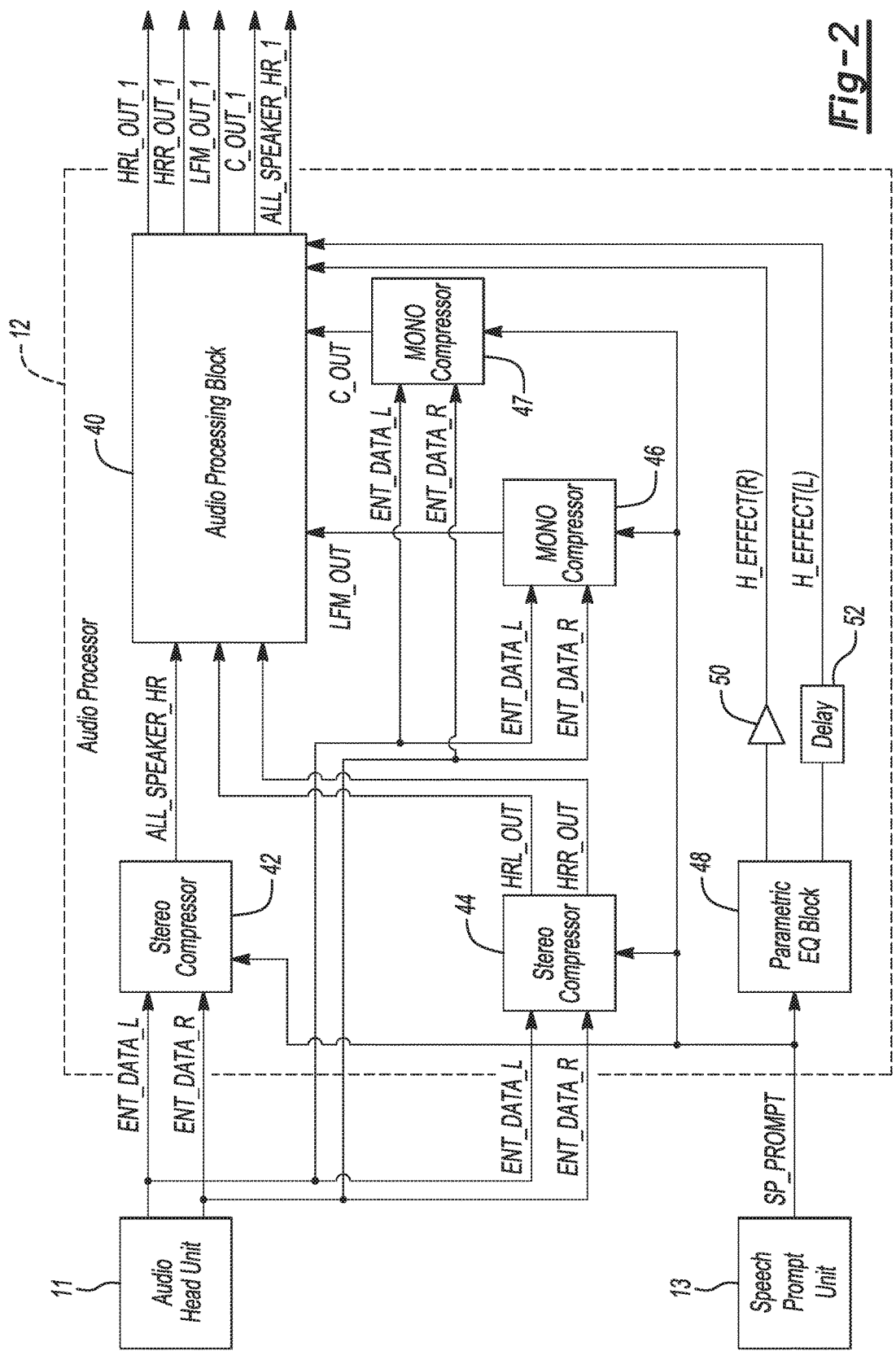
FIG. 2 depicts a more detailed implementation of the audio head unit, the audio processor and the speech prompt unit in accordance to one embodiment.

FIG. 2 depicts a more detailed implementation of the audio head unit 11, the audio processor 12, and the speech prompt unit 13 in accordance to one embodiment. The audio processor 12 generally includes an audio processing block 40, a first stereo compressor 42, a second stereo compressor 44, a first mono compressor 46, a second mono compressor 47, a parametric equalization block 48, a gain block 50, and a delay block 52. The first stereo compressor 42 is configured to receive the entertainment data (i.e., left and right entertainment data) from the audio head unit 11 via signals ENT_DATA_L and ENT_DATA_R. The first stereo compressor 42 is also configured to receive the speech prompt unit 13 via a signal SP_PROMPT from the speech prompt unit 13. The first stereo compressor 42 may be arranged as to slightly compress or slightly mute the entertainment data when played back in a cabin of the vehicle in response to receiving the signal SP_PROMPT (i.e., a speech prompt is being played back to the driver). The use of the first stereo compressor 42 may be optional and may be needed based on overall vehicle cabin acoustics.

The first stereo compressor 42 transmits a signal ALL_SPEAKER-HR to the audio processer block 40 which includes the entertainment data in a slightly compressed state (or muted state). The audio processing block 40 equalizes the entertainment data on the signal AL_SPEAKER_HR and transmits an output on a signal ALL_SPEAKER_HR_1 to the speakers 14*c*-14*j* so that such speakers 14*c*-14*j* play back the entertainment data at the compressed or muted state while the speakers 14*a*-14*b* transmit the speech prompt to the driver. In this case, the signal ALL_SPEAKER-HR will include the entertainment data for play back for all of the speakers in the vehicle except for the speakers (e.g., speakers 14*a*-14*b*) that play back the speech prompt.

The second stereo compressor 44 is also configured to receive the entertainment data (i.e., left and right entertainment data) from the audio head unit 11 via the signals ENT_DATA_L and ENT_DATA_R. The second stereo compressor 44 is also configured to receive the speech prompt unit 13 via the signal SP_PROMPT from the speech prompt unit 13. The second stereo compressor 44 may be arranged to heavily compress or mute the entertainment data such that the speakers 14*a*, 14*b* in the headrest 30 do not play back the entertainment data in response to receiving the signal SP_PROMPT (i.e., a speech prompt is being played back to the driver). In this case, the speakers 14*a*, 14*b* in the headrest 30 only play back the speech prompt.

The second stereo compressor 44 transmits signals HRL_OUT and HRR_OUT to the audio processer block 40. The signals HRL_OUT and HRR_OUT correspond to the muted entertainment data. The audio processing block 40 may suppress the entertainment data from being transmitted to the speakers 14*a*, 14*b* in the headrest 30 and enable only the speech prompt data to be transmitted to the speakers 14*a*, 14*b* in the headrest 30. Additional processing will be performed to the speech prompt data prior to the speakers 14*a*, 14*b* in the headrest 30 receiving the speech prompt data.

Each of the first mono compressor 46 and the second mono compressor 47 is also configured to receive the entertainment data (i.e., left and right entertainment data) from the audio head unit 11 via the signals ENT_DATA_L and ENT_DATA_R. The first mono compressor 46 is configured to compress frequencies in a vocal range that are present in the entertainment data and played back by the speaker 14*c* in response to receiving the speech prompt data from the speech prompt unit 13. For example, the first mono compressor 46 is configured to compress frequencies in the vocal range (e.g., 300 Hz-5 KHz) that are present in the entertainment data and played back by the speaker 14*c* (i.e., the left-front mid-range speaker). The second mono compressor 47 is configured to compress frequencies in a vocal range that are present in the entertainment data and played back by the speaker 14*d* in response to receiving the speech prompt data from the speech prompt unit 13. The second mono compressor 47 is configured to compress frequencies in the vocal range (e.g., 300 Hz-5 KHz) that are present in the entertainment data and played back by the speakers 14*d* (i.e., the center speaker). It is recognized that the first mono compressor 46 may compress the entertainment data at a rate that is different than that provided by the second mono compressor 47. In one example, the first mono compressor 46 may compress the vocal range in the entertainment data for the speaker 14*c* at a rate that is greater than the level that the second mono compressor 47 compresses the vocal range in the entertainment data for the speaker 14*d*. It may be beneficial to compress the vocal range in the entertainment data that is fed to the speaker 14*c* (e.g., via the first mono compressor 46) than that of the vocal range in the entertainment data that is fed to the speaker 14*d* (via the second mono compressor 57) since the speaker 14*c* is positioned closer to the driver than the speaker 14*d*. By reducing the overall vocal range that is present in the entertainment data for the speakers 14*c* and 14*d*, this condition prevents interference between the vocal audio data of the entertainment data and the speech prompt data that is played back at the speakers 14*a*, 14*b* in the headrest 30. In other words, the first mono compressor 46 and the second mono compressor 47 squashes the dynamic range of the vocal data and produces ducking which is also known as attenuation for the speakers 14*c* and 14*d*.

The first mono compressor 46 and the second mono compressor 47 transmit signals LFM_OUT and C_OUT, respectively, to the audio processing block 40. The signal LFM_OUT generally corresponds to the entertainment data that includes a ducked vocal range and that may otherwise be played back by the center speakers (i.e., the speakers 14*c* as illustrated in FIG. 1). The signal C_OUT generally corresponds to the entertainment data that includes a ducked vocal range and that is intended to be transmitted to the speaker 14*d* that provides a center channel. The audio processing block 40 equalizes the compressed entertainment data on the signals LFM_OUT and C_OUT and transmits the same to the speaker 14*c* (e.g., the speaker positioned in the instrument panel and closest to the driver) and to the speaker 14*d* (e.g., the speaker positioned in a center of the instrument panel or to the center channel speaker).

The parametric equalization block 48 receives the speech prompt from the speech prompt unit 13. In general, the parametric equalization block 48 provides flexibility in modifying left and right speech prompt channels with different options. The parametric equalization block 48 is generally configured to provide a dedicated speech prompt output to the speaker 14*a* (i.e., the left speaker in the headrest 30 (or left channel)) and a dedicated speech prompt output to the speaker 14*b* (i.e., the right speaker in the headrest 30 (or right channel)). Prior to the speech prompt data being delivered to the left speaker 14*a* and the right speaker 14*b* in the headrest 30, the gain block 50 and the delay block 52 employ a binaural psychoacoustic effect such as for example, the Haas effect which causes the speech prompt to have a more balanced sound for the driver. With the Haas effect, the delay block 52 delays the speech prompt that is output from the left speaker 14*a* of the headrest 30. In addition, the gain block 50 attenuates the speech prompt that is output from the right speaker 14*a* of the headrest 30. The delay block 52 provides the delay to the speech prompt on the left channel (i.e., the left speaker 14*a*) so that the driver does not perceive the speech prompt from the left speaker 14*a* to be louder than the speech prompt from the right speaker 14*b*. The gain block 50 attenuates the speech prompt desired for output from the right speaker 14*b* so that the speech prompt from the right speaker 14*b* does not bleed over to disrupt the output from the left speaker 14*a* of the headrest 30.

With the psychoacoustic effect, when the speech prompt (i.e., when output from the right speaker 14*b*) is followed by the speech prompt (i.e., from the output of the speaker 14*a*) separated by a sufficiently short time delay (e.g., below the listener's echo threshold), the driver may perceive a single fused auditory image. In this case, the driver's perceived spatial location is dominated by the location of the first-arriving sound (e.g., the speech prompt from the right speaker 14*b*). The lagging speech prompt from the left speaker 14*a* affects the perceived location. However, the lagging speech prompt is suppressed by the first-arriving speech prompt from the right speaker 14*b*.

The audio processing block 40 receives a signal H_EFFECT (R) from the gain block 50 which corresponds to the speech prompt data that is to be transmitted to the right speaker 14*b*. The audio processing block 40 receives a signal L_EFFECT (L) from the delay block 52 which corresponds to the speech prompt data that is to be transmitted to the left speaker 14*a*. The audio processing block 40 equalizes the speech prompt data on the signals H_EFFECT (L) and H_EFFECT (R). The audio processing block 40 transmits the speech prompt data from the signal H_EFFECT (L) after equalization to the left speaker 14*a* for playback. The audio processing block 40 transmits the speech prompt data from the signal H_EFFECT (R) after equalization to the right speaker 14*b* for playback.

In general, the vehicle audio system 10 may minimize interference between the speech prompt for its intended audience (i.e., the driver) and the entertainment audio (i.e., all vehicle passengers). The audio processing block 40 may also maintain a minimum level of differential between the speech prompts and the entertainment audio from the various entertainment or music sources. One or more aspects of the vehicle audio system 10 may be utilized to execute the following methods as described below in detail.

Figure 3:
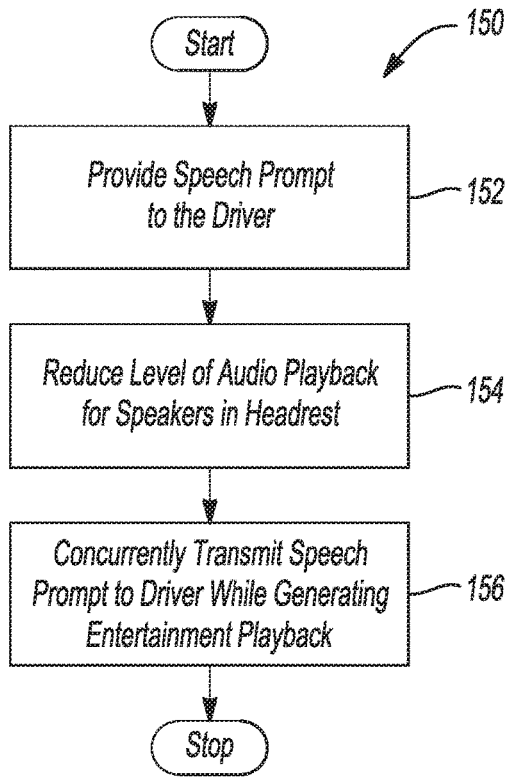
FIG. 3 depicts a method for isolating speech prompts in accordance to one embodiment.

FIG. 3 depicts a method 150 for isolating speech prompts in accordance to one embodiment.

In operation 152, the audio processor 12 determines that it is necessary to provide a speech prompt to the driver in response to receiving speech prompt data over the signal SP_PROMPT from the speech prompt unit 13.

In operation 154, the audio processor 12 reduces or suppresses the level of the entertainment data that is broadcast to the left speaker 14*a* and the right speaker 14*b* of the headrest 30.

In operation 156, the audio processor 12 concurrently transmits the entertainment data to the speakers 14*c*-14*k* and the speech prompt data to the speakers 14*a* and 14*b*.

Figure 4:
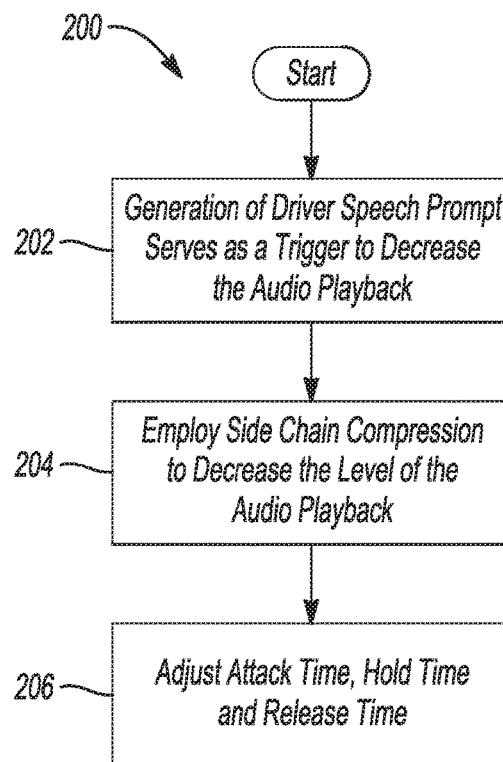
FIG. 4 depicts a method for isolating speech prompts in accordance to one embodiment.

FIG. 4 depicts a method 200 for isolating speech prompts in accordance to one embodiment.

In operation 202, the audio processor 12 receives the speech prompt from the speech prompt unit 13 which serves as a trigger to decrease the level of volume at which the entertainment audio is played back in the vehicle.

In operation 204, the audio processor 12 employs compression (or side chain compression) to the various speakers 14*a*-14*k* to adjust (or decrease) the level of volume at which the entertainment audio is played back in the vehicle. For example, with respect to the speakers 14*a* and 14*b* in the headrest 30, the ratio for side compression on the entertainment data is the highest in comparison to the amount of compression employed on the entertainment audio for the speakers 14*c*-14*k*. As noted above, the second stereo compressor 44 suppresses (or mutes) the entertainment audio that is transmitted to the speakers 14*a* and 14*b* in the headrest 30. In one example, a high ratio of 5:1 (i.e., ratio of compression) ensures that for every 5 units of increase in level beyond a set threshold, the second stereo compressor 44 (or the audio processor 12) allows the level to increase by only one unit. A threshold of −50 dB ensures that whenever the level of the speech prompt goes above the low level of −50 dB, the compressions kicks in and the level of the entertainment audio begins to decrease. The lower the threshold, the sooner the compression begins.

The first mono compressor 46 and the second mono compressor 47 slightly reduce the volume of the entertainment audio that is played back on the speakers 14*c* and 14*d* (i.e., the left front midrange speaker and the center midrange speaker), respectively. The audio processor 12 may compress the entertainment audio for the speakers 14*c* and 14*d* differently from one another. As noted above, the first mono compressor 46 may compress the vocal range of the entertainment data at a rate that is greater than the compression provided by the second mono compressor 47 since the speaker 14*c* (i.e., the output from the first mono compressor 46) is closer to the driver than the speaker 14*d*. In one example, the first mono compressor 46 may provide a compression ratio of 1.35:1 (e.g., a first predetermined compression ratio or first predetermined amount) to compress the vocal range and the threshold may be −35 dB. For the speaker 14*d*, the second mono compressor 47 may provide a compression ratio of 1.15:1 (e.g., a second predetermined compression ratio or a second predetermined amount) to compress the vocal range and the threshold may be −35 dB.

With respect to the compression ratio, every 20 dB increment in sound means that the level increases 10× times in terms of a linear unit such as voltage. A 0 dB based audio input signal corresponds to no amplification/reduction (i.e., this is an absolute signal). In general, the following linear units may correspond to the following threshold in dB:

−40 dB=0.01 linear units (or Volts);
−35 dB=0.0178 linear units (or Volts);
−30 dB=0.0316 linear units (or Volts);
−25 dB=0.0562 linear units (or Volts);
−20 dB=0.1 linear units (or Volts).

Therefore, in connection with the compression ratio of 1.35:1 as applied by the first mono compressor 46 to the entertainment data for the speaker 14c, there will be no compression on the input signal (i.e., the entertainment data) when the amplitude of the input signal is less than 0.0178 linear units (or −35 dB). In other words, the input signal is equal to the output signal from the first mono compressor 46. When the signal amplitude of the input signal increases beyond the threshold of 0.0178 linear units (or −35 dB) for every 1.35 units increase in the input signal to the first mono compressor 46, the output from the first mono compressor 46 is increased by 1 unit.

Further, in connection with the compression ratio of 1.15:1 as applied by the second mono compressor 47 to the entertainment data for the speaker 14d, there will be no compression on the input signal when the amplitude of the input signal is less than 0.0178 units) or (−35 dB), i.e., the input signal is equal to the output signal from the second mono compressor 47. When the signal amplitude of the input signal increases beyond the threshold of 0.0178 linear units or −35 dB, for every 1.15 units increase in the input signal to the second mono compressor 47, the output from the second mono compressor 47 is increased by 1 unit.

In general, the audio processor 12 lowers the level of the entertainment audio through the various speakers 14a-14k by a different amount proportional to an energy level in the speech prompt data. Hence, the audio processor 12 may not change the level of the entertainment audio where there are no speech prompts and the level of the entertainment audio is generally reduced linearly in relation to an increase in the level of the speech prompts. The audio processor 12 is configured to perform equalization and provide delay compensation for all of the speakers 14a-14k in the vehicle.

In operation 206, the audio processor 12 adjusts the attack time, the hold time, and/or the release time for the speech prompt to appear intelligible to the driver. For example, the attack time may be 0 to 5 ms, the hold time may be around 200 ms, and the release time may be much slower, such as, around 1200 ms. In addition to the attack, hold and release time parameters, the ratio and threshold parameters may be varied for the different sets of speakers 14a-14n.

Figure 5:
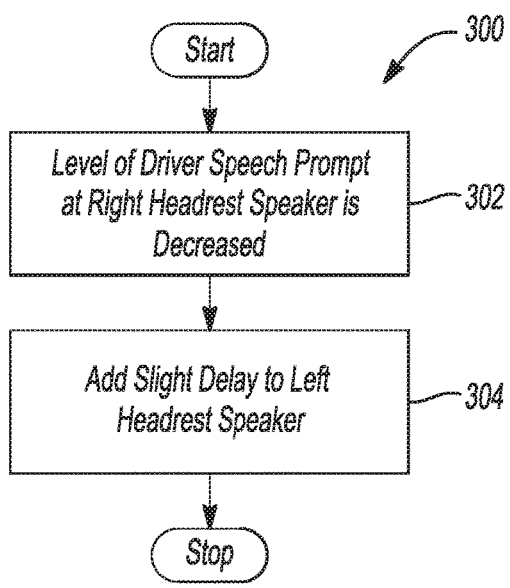
FIG. 5 depicts a method for applying a binaural psychoacoustic effect to the speech prompt output at speakers in accordance to one embodiment.

FIG. 5 depicts a method 300 for applying a binaural psychoacoustic effect to the speech prompt output at the speakers 14a, 14b of the headrest 30.

In operation 302, the audio processor 12 via the gain block 50 decreases the level of the speech prompt (or decreases the gain of the speech prompt) at the speaker 14b (i.e., the right speaker in the headrest 30). Since the speaker 14b is closer of the two speakers 14a, 14b in the headrest 30 to two of the three passenger seats (e.g., assuming there is one front passenger seat with speakers in a corresponding headrest thereof and another rear right passenger seat with speaker in a corresponding headrest thereof), the audio processor 12 via the gain block 50 reduces the level of the speech prompt of the right speaker 14b to increase isolation and to decrease sound bleed of the speech prompt from the right speaker 14b to the other seats in the vehicle. This aspect may cause a shift in the image.

In operation 304, the audio processor 12, to account for the shift in the image attributed to the attenuation of the speech prompt at the speaker 14b, utilizes the delay block 52 to add a delay to the speech prompt from the speaker 14a (i.e., the left speaker in the headrest 30) so that the driver first hears the speech prompt from the right speaker 14b in the headrest 30. The reduction in gain of the speaker 14b and delay to the left speaker 14a creates the Haas effect (or the binaural psychoacoustic effect) therefore attenuating higher frequencies and increasing isolation.

Music in general can be very dynamic in terms of loudness. For example, in classical music, pianissimo sections may be intended to be performed very softly and the fortissimo sections may be intended to be performed very loudly and can have different loudness levels. It is desirable to have the speech prompts that are at a loudness level where such speech prompts are not masked by the music. Even though music (or entertainment audio) is played back from any one or more of the speakers 14a-14n at compressed levels (i.e., levels are reduced) to different extents, at loud sections of music, any of the one or more other speakers 14a-14n may still reproduce music loud enough to mask the speech prompts. Essentially, the RMS level of the speech prompts over the period of activity can be considered a constant. In other words, the RMS level of the speech prompt can be considered as being deterministic. This is attributed to the speech prompt audio including mostly artificially generated speech audio based on certain voice synthesis models. Music on the other hand will have sudden changes in RMS levels and hence is more stochastic/probabilistic. At loud music sections, the RMS music increases causing the difference between the speech prompt RMS level (constant) and the RMS music level to go down. As a solution, feed-forward Automatic Gain Control (AGC) system is proposed. When the difference between the RMS levels of music and speech prompts goes below a threshold, an AGC unit of the AGC system amplifies the speech prompt according to a perceptually based loudness calculation, thus increasing the RMS level of the speech prompt and this increases the RMS level difference between the music and speech prompts. This aspect ensures that the driver can hear the speech prompts easily even with loud sections of music being played in the background.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for enhancing speech prompts in a vehicle, the apparatus comprising:
   an audio processor being electrically coupled to a plurality of loudspeakers in a vehicle, wherein the plurality of loudspeakers includes more than two loudspeakers, the audio processor being programmed to:
   provide entertainment data to the plurality of loudspeakers for playback in the vehicle;
   receive a speech prompt indicative of only a spoken audio output to a driver in the vehicle;
   mute the entertainment data that is played back on a first loudspeaker and a second loudspeaker of the plurality of loudspeakers in response to the speech prompt; and
   provide the speech prompt to the first loudspeaker and the second loudspeaker for playback to the driver after muting the entertainment data.

2. The apparatus of claim 1 wherein the audio processor is further programmed to add a delay to the speech prompt that is provided to the first loudspeaker and to reduce a gain of the speech prompt that is provided to the second loudspeaker to employ a binaural psychoacoustic effect for the driver.

3. The apparatus of claim 1 wherein the first loudspeaker and the second loudspeaker are positioned in a headrest of a driver seat.

4. The apparatus of claim 1 wherein the audio processor includes a first compressor to receive the entertainment data and the speech prompt and to mute the entertainment data only in response to receiving the speech prompt.

5. The apparatus of claim 1 wherein the audio processor includes a first compressor to receive the entertainment data and the speech prompt and to compress a vocal range on the entertainment data by a first predetermined amount for a second loudspeaker of the plurality of loudspeakers that is positioned proximate to the driver.

6. The apparatus of claim 5 wherein the first compressor compresses the vocal range on the entertainment data by a second predetermined amount for a third loudspeaker of the plurality of loudspeakers that is positioned proximate to the driver.

7. The apparatus of claim 6 wherein the first predetermined amount is different than the second predetermined amount.

8. The apparatus of claim 6 wherein the first predetermined amount is greater than the second predetermined amount.

9. The apparatus of claim 8 wherein the second loudspeaker is positioned closer to the driver than the third loudspeaker.

10. A method for enhancing speech prompts in a vehicle, the method comprising:
  providing, via an audio processor, entertainment data to a plurality of loudspeakers for playback in a vehicle, the plurality of loudspeakers including more than two loudspeakers;
  receiving a speech prompt at the audio processor, the speech prompt being indicative of only a spoken audio output to a driver in the vehicle;
  muting the entertainment data that is played back on a first headrest loudspeaker and a second headrest loudspeaker of the plurality of loudspeakers in response to the speech prompt; and
  providing the speech prompt to the first headrest loudspeaker and the second headrest loudspeaker for playback to the driver after muting the entertainment data.

11. The method of claim 10 further comprising: adding a delay to the speech prompt that is provided to the first headrest loudspeaker; and reducing a gain of the speech prompt that is provided to the second headrest loudspeaker to employ a binaural psychoacoustic effect for the driver.

12. The method of claim 10 further comprising:
  receiving, at a first compressor, the entertainment data and the speech prompt; and
  compressing, with the first compressor, a vocal range on the entertainment data by a first predetermined amount for a first loudspeaker of the plurality of loudspeakers that is positioned proximate to the driver.

13. The method of claim 12 wherein compressing, with the first compressor, the vocal range on the entertainment data by a second predetermined amount for a second loudspeaker of the plurality of loudspeakers that is positioned proximate to the driver.

14. The method of claim 13 wherein the first predetermined amount is different than the second predetermined amount.

15. The method of claim 13 wherein the first predetermined amount is greater than the second predetermined amount.

16. A computer-program product embodied in a non-transitory computer readable medium that is programmed for enhancing speech prompts, the computer-program product comprising instructions to:
  provide entertainment data to a plurality of loudspeakers including more than two loudspeakers for playback in a vehicle;
  receive a speech prompt indicative of only a spoken audio output to a driver in the vehicle;
  mute the entertainment data that is played back on a first headrest loudspeaker and a second headrest loudspeaker in response to the speech prompt; and
  provide the speech prompt to the first headrest loudspeaker and the second headrest loudspeaker for playback to the driver after muting the entertainment data.

* * * * *